United States Patent
Kim et al.

(10) Patent No.: US 8,042,058 B2
(45) Date of Patent: Oct. 18, 2011

(54) PORTABLE DEVICE HAVING ROTATABLE INPUT BUTTONS AND METHOD OF OPERATING THE SAME

(75) Inventors: Min-chul Kim, Seoul (KR); Young-wan Seo, Suwon-si (KR); Eun-jung Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 11/604,306

(22) Filed: Nov. 27, 2006

(65) Prior Publication Data
US 2007/0146352 A1    Jun. 28, 2007

(30) Foreign Application Priority Data

Dec. 28, 2005   (KR) .................... 10-2005-0132045

(51) Int. Cl.
*G06F 3/048* (2006.01)
(52) U.S. Cl. .................... 715/771; 715/700; 715/764
(58) Field of Classification Search .................. 345/156, 345/157, 160, 168, 169; 455/556.1, 556.2; 715/700, 764, 771
See application file for complete search history.

(56) References Cited

U.S. PATENT DOCUMENTS

| | | | | |
|---|---|---|---|---|
| 6,593,914 | B1* | 7/2003 | Nuovo et al. | 345/169 |
| 7,046,230 | B2* | 5/2006 | Zadesky et al. | 345/156 |
| 7,286,115 | B2* | 10/2007 | Longe et al. | 345/168 |
| 7,750,891 | B2* | 7/2010 | Stephanick et al. | 345/173 |
| 2003/0076306 | A1* | 4/2003 | Zadesky et al. | 345/173 |
| 2004/0070567 | A1* | 4/2004 | Longe et al. | 345/156 |
| 2005/0052406 | A1* | 3/2005 | Stephanick et al. | 345/156 |

FOREIGN PATENT DOCUMENTS

| | | |
|---|---|---|
| CN | 1274892 A | 11/2000 |
| JP | 2001-160933 A | 6/2001 |
| JP | 2002-91680 A | 3/2002 |
| JP | 2003-296006 A | 10/2003 |
| JP | 2004-295355 A | 10/2004 |
| JP | 2004-326427 A | 11/2004 |
| WO | 2005/109165 A2 | 11/2005 |

* cited by examiner

*Primary Examiner* — My-Chau T Tran
(74) *Attorney, Agent, or Firm* — Sughrue Mion, PLLC

(57) ABSTRACT

A portable device having rotatable input buttons and a method of operating the portable device are provided. The portable device includes a button rotation detecting unit, a User Interface (UI) generating unit and a mode setting unit. The button rotation detecting unit detects the rotation of the input buttons. The UI generating unit generates desired objects. The mode setting unit changes a current mode of the portable device to a mode of operating on the objects corresponding to the positions of the rotated input buttons when the rotation of the input buttons is detected.

12 Claims, 10 Drawing Sheets

PORTABLE DEVICE HAVING ROTATABLE INPUT BUTTONS AND METHOD OF OPERATING THE SAME

CROSS-REFERENCE TO RELATED APPLICATION

This application claims priority from Korean Patent Application No. 10-2005-0132045 filed on Dec. 28, 2005 in the Korean Intellectual Property Office, the disclosure of which is incorporated herein by reference in its entirety.

BACKGROUND OF THE INVENTION

1. Field of the Invention

The present invention relates to a portable device having rotatable input buttons and a method of operating the portable device, and more particularly, to a portable device having rotatable input buttons, in which the input buttons mounted on the portable device can be rotated through a predetermined angle to execute specific functions, and a method of operating the portable device.

2. Description of the Related Art

Currently, Graphical User Interfaces (GUIs) are gradually supporting various environments in many fields. For example, a three-dimensional (3D) environment-User Interface (UI) has recently started to be introduced into the gaming field. Furthermore, various GUI environments, such as an interface environment having a zoom in/out function, through which users cannot navigate using only an existing two-dimensional navigation-type 4-way (up, down, left and right) key, are coming into existence.

Further, many devices are gradually trending toward small size and multiple functions, so that input devices capable of supporting various and multiple functions are required.

Conventional 4-way keys support only a navigation scheme of mapping the (+) and (−) directions of x and y axes to four buttons, respectively, and enabling movements along x and y axes.

However, although different types of input devices are required as UIs have gradually diversified into various types (for example, a 3D UI and a zoom in/out UI), only a limited range of UI shapes has been designed, and has not changed. Therefore, the existing 4-way key capable of supporting only 4 directional movements continues to be used.

That is, there are many cases where a method of performing navigation in the z-axis direction is not actually supported in a 3D environment. Even in the case of the zoom in/out function, the 4-way key is repeatedly used (for example, up and down buttons are used for the zoom in/out function when 4 directional movements are not supported).

Furthermore, there are problems in that it is not possible to perform simultaneous navigation in three axial directions, and the same input element (for example, a button of the 4-way key) is variously used as different navigation buttons depending on the circumstances, thus causing difficulty when using the 4-way key.

Accordingly, in order to support navigation functions in various changing environments (for example, a z-axis navigation function or a zoom in/out function in a 3D environment) which cannot be dealt with using the existing 4-way key, a new type of input device is required.

Japanese Unexamined Patent No. 2002-0916809 (Switch Device and Portable Terminal) discloses a switch device and a portable terminal, in which a first switch capable of selecting functions along a cross path and a second switch rotating around the first switch are included, and the function of the first switch can be changed by rotating the handle of the second switch. However, the above-mentioned patent aims only to change the function of the first switch when the handle of the second switch is rotated, but does not disclose a technology for changing the arrangement of objects on a screen to correspond to the position of the switch.

SUMMARY OF THE INVENTION

Accordingly, aspects of the present invention have been made keeping in mind the above problems occurring in the related art, and an aspect of the present invention is to conveniently manipulate objects arranged to correspond to the positions of rotated input buttons by rotating the input buttons provided in a portable device through a predetermined angle.

Another aspect of the present invention is to conveniently manipulate menu layers provided 3-dimensionally on a display panel by rotating input buttons provided in the portable device through a predetermined angle.

In order to accomplish the above aspects, an exemplary embodiment of the present invention provides a portable device having rotatable input buttons, the portable device including a button rotation detecting unit which detects rotation of the input buttons; a UI generating unit which generates desired objects; and a mode setting unit which changes the current mode of the portable device to a mode of operating on the objects corresponding to positions of the rotated input buttons when the rotation of the input buttons is detected.

Furthermore, an exemplary embodiment of the present invention provides a portable device having rotatable input buttons, the portable device including an input button set which rotates in a desired direction and having a number of input buttons; a display panel which displays objects corresponding to the positions of rotated input buttons when the rotation of the input buttons is detected; and a control unit which operates on an object corresponding to the position of a selected input button when the desired input button is selected.

Furthermore, an exemplary embodiment of the present invention provides a method of manipulating a portable device having rotatable input buttons, the method including detecting the rotation of input buttons; changing the current mode of the portable device to an input mode and setting the changed mode when the rotation of the input button is detected; displaying desired objects to correspond to the positions of the input buttons when the current mode is changed to the input mode; and operating on (activating or engaging) an object corresponding to the position of a selected input button when the desired input button is selected.

BRIEF DESCRIPTION OF THE DRAWINGS

The above and other aspects, features and advantages of the present invention will be more clearly understood from the following detailed description taken in conjunction with the accompanying drawings, in which.

DESCRIPTION OF THE PREFERRED EMBODIMENTS

Various aspects and features of the invention will become more apparent from the following detailed description and exemplary embodiments taken in conjunction with the accompanying drawings. However the present invention is not limited to the disclosed exemplary embodiments, but may be implemented in various manners. The exemplary embodiments are provided to complete the disclosure of the present invention and to allow those having ordinary skill in the art to understand the aspects of the present invention. The present invention is defined only by the appended claims. The same reference numbers will be used throughout the drawings to refer to the same or like parts.

Hereinafter, an exemplary embodiment of the present invention will be described in detail with reference to the accompanying drawings.

Figure 1:
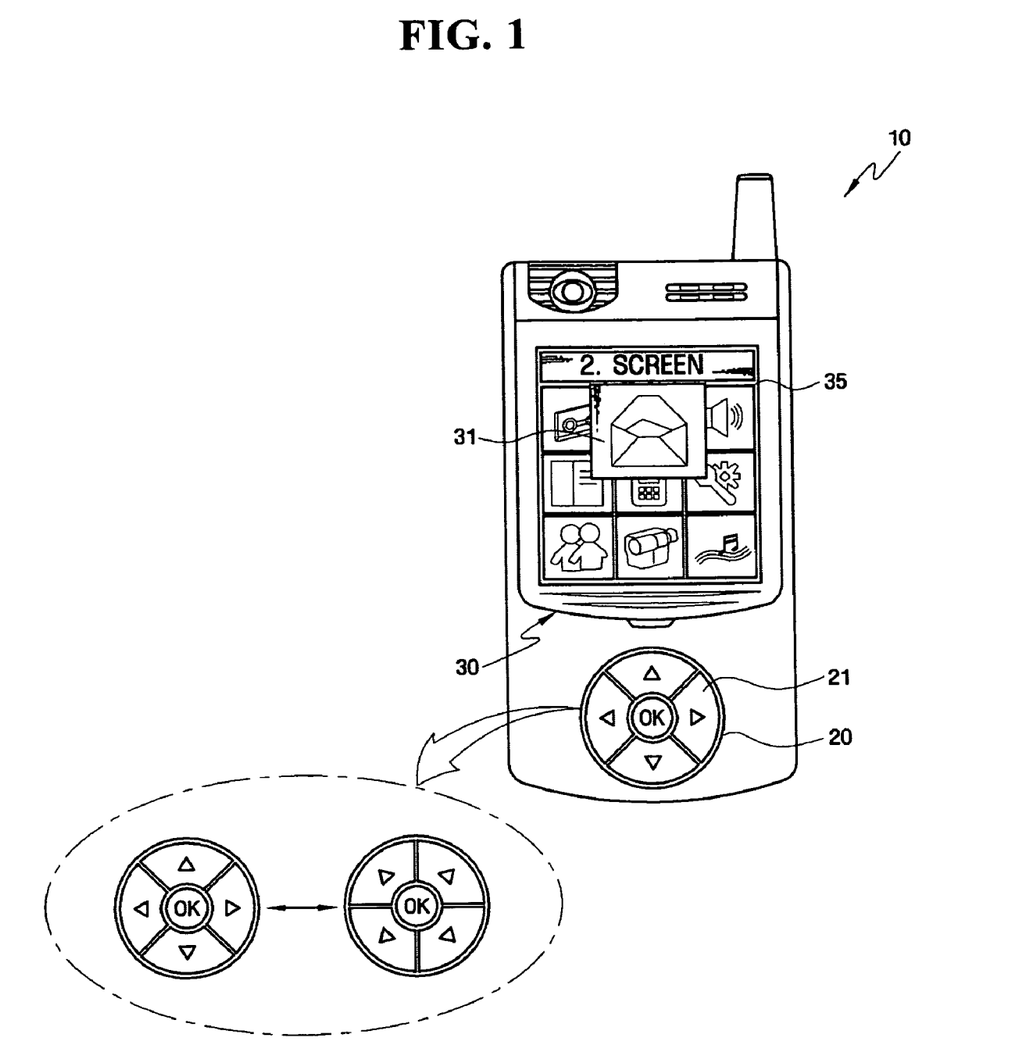
FIG. 1 is a view showing a portable device having rotatable input buttons according to an exemplary embodiment of the present invention.

FIG. 1 is a view showing a portable device 10 having rotatable input buttons according to an exemplary embodiment of the present invention.

As shown in FIG. 1, the portable device 10 includes an input button set 20, a display panel 30, and a control unit (not shown).

The input button set 20 can be rotated in a predetermined direction, and includes a number of input buttons 21. In this case, when the input button set 20 is rotated through a predetermined angle, the input buttons 21 are also rotated through the predetermined angle, in which case the mode of the portable device 10 is changed and set. In this case, the mode of the portable device 10 can be set to a basic mode and an input mode.

That is, when the input button set 20 is not rotated, the mode of the portable device 10 is set to a basic mode, in which a pointer (not shown) is moved in the directions set for the input buttons 21. When the input button set 20 is rotated, the mode of the portable device 10 is set to an input mode in which objects 31 corresponding to the positions of the input buttons 21 can be manipulated.

For example, in the case of the basic mode, a user can move between the objects 31 provided on the display panel 30 and select desired objects 31, by moving the pointer in the directions set for the input buttons 21.

Furthermore, in the case of the input mode, the user can directly select the objects 31 arranged to correspond to the positions of the input buttons 21, or zoom in and out the images of the objects 31.

Hereinafter, a description of the operation of the portable device 10 in the input mode will be given with reference to FIGS. 2A, 2B and 2C.

The display panel 30 displays a menu layer 35 having a number of objects 31, and the operational commands of the objects 31.

For example, when the rotation of the input buttons 21 is detected, the objects 31 corresponding to the positions of the rotated input buttons 21 are activated and displayed.

When a desired input button 21 is selected, the control unit executes the operational command of the desired object 31 corresponding to the position of the selected input button 21.

Figure 2A:
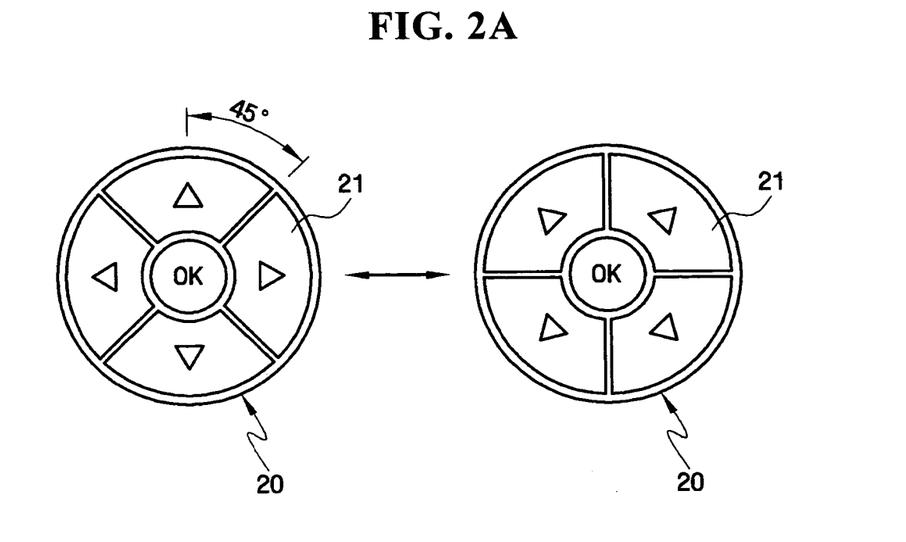
FIGS. 2A, 2B and 2C are views showing an example in which the rotatable input button set provided in the portable device having the rotatable input buttons according to the exemplary embodiment of the present invention are rotated.
Figure 2B:
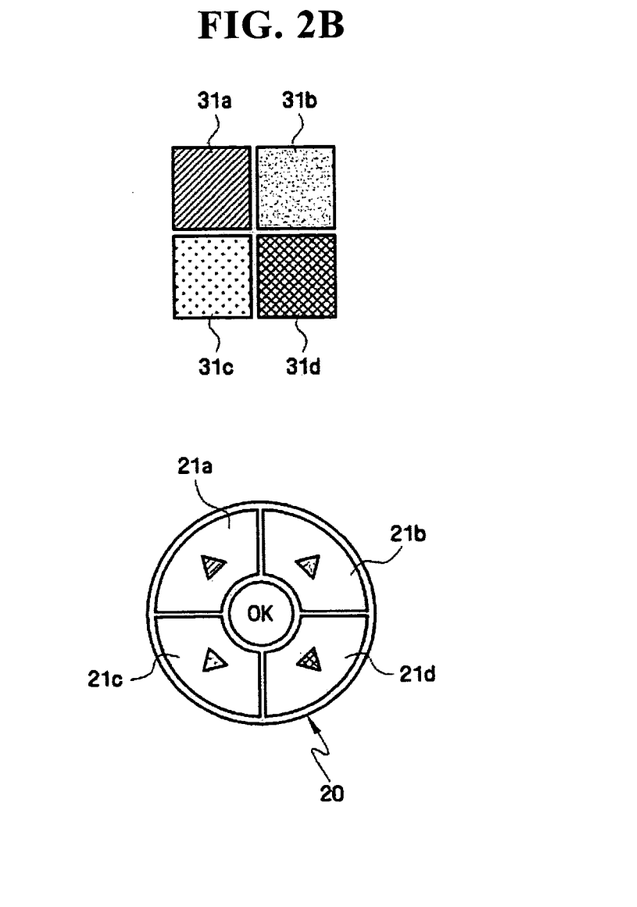
Figure 2C:
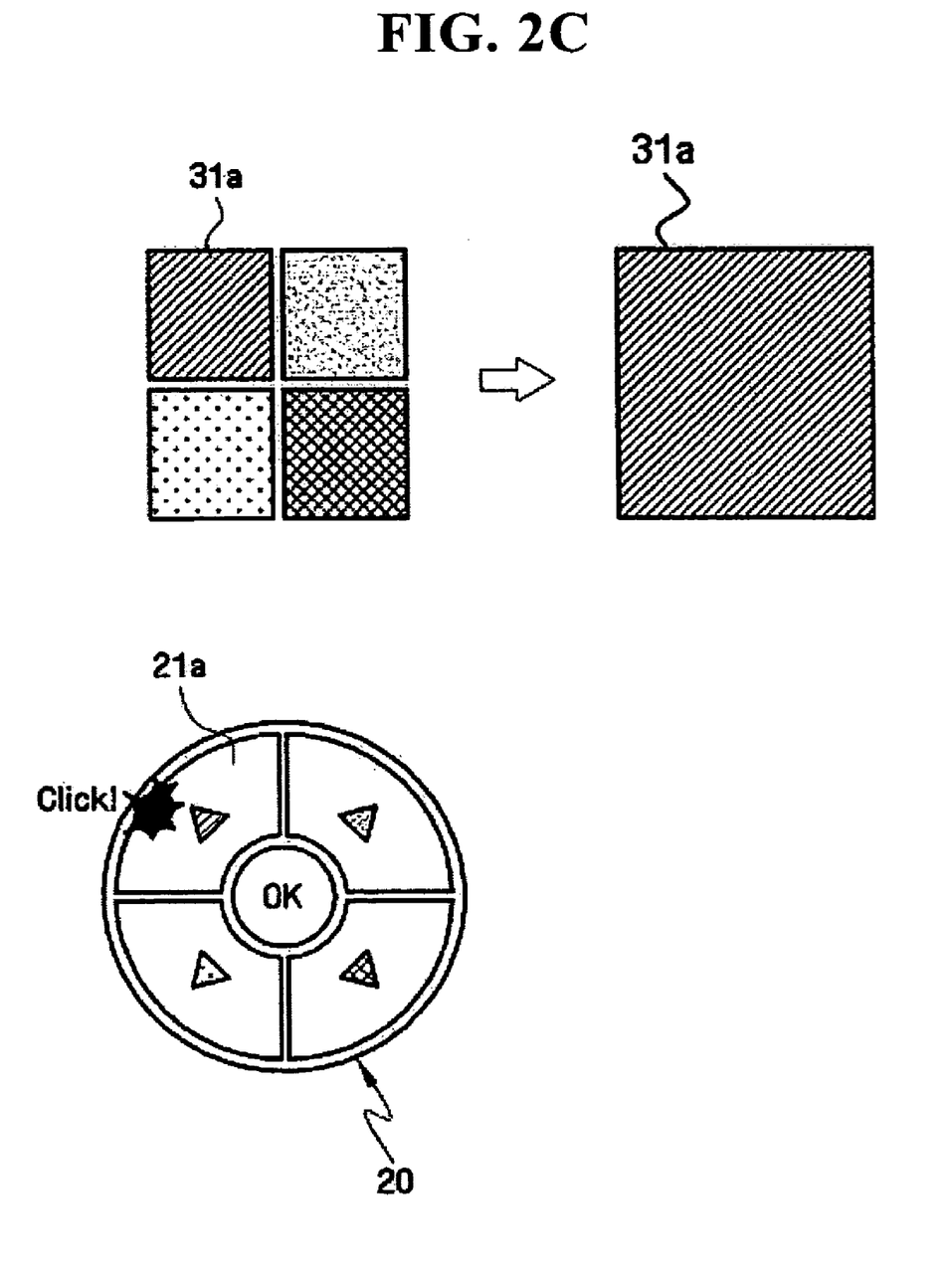

FIGS. 2A, 2B and 2C are views showing an example in which the rotatable input button set provided in the portable device having the rotatable input buttons according to the exemplary embodiment of the present invention are rotated.

As shown in FIG. 2A, when the input button set 20 is rotated in a predetermined direction (preferably but not necessarily, through an angle of 45°), the input buttons 21 are also rotated through a predetermined angle, together with the input button set 20. In this case, the rotated input buttons 21 can be represented in the form of 1st, 2nd, 3rd and 4th quadrants.

As shown in FIG. 2B, the rotated input buttons 21a, 21b, 21c and 21d are represented in the form of 1st, 2nd, 3rd and 4th quadrants, and objects 31a, 31b, 31c and 31d displayed on a display panel 30 are arranged to correspond to the 1st, 2nd, 3rd and 4th quadrants of the input buttons.

As an illustration, when the user selects a desired input button (for example, 21a), a desired object (for example, 31a) arranged to correspond to the selected input button (for example, 21a) is activated and operated.

As shown in FIG. 2C, the rotated input buttons are represented in the form of 1st, 2nd, 3rd and 4th quadrants, and the objects 31a, 31b, 31c and 31d displayed on the display panel 30 are arranged to correspond to the 1st, 2nd, 3rd and 4th quadrants of the input buttons. In this case, the displayed objects are assumed to be image files.

Further, when the user selects a desired input button (for example, 21a), the image of the desired object (for example, 31a) arranged to correspond to the selected input button (for example, 21a) is zoomed in. When the user repeatedly selects the same input button (for example, 21a), the image of the same object (for example, 31a) is displayed across the entire screen of the display panel 30.

Figure 3:
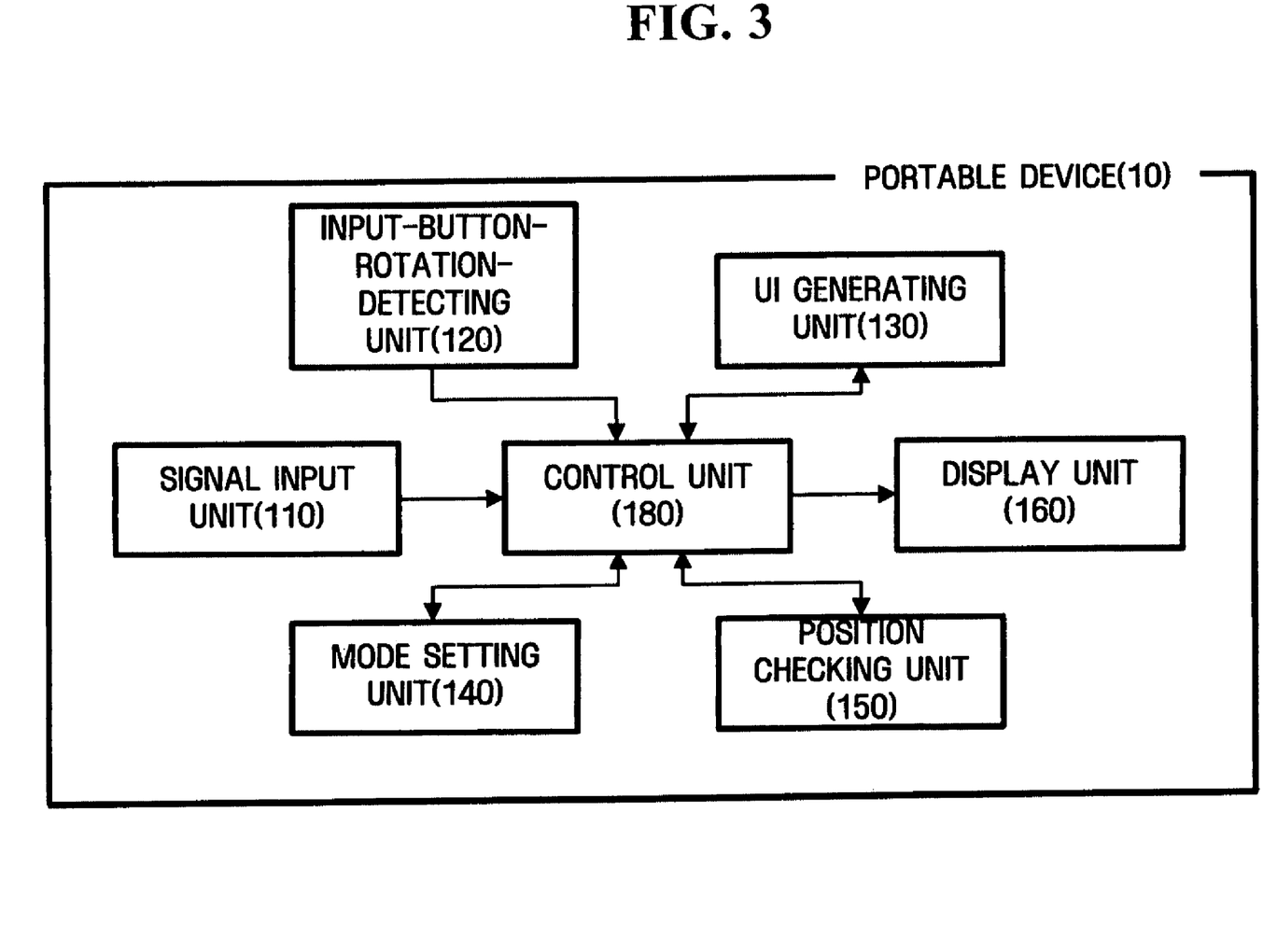
FIG. 3 is a block diagram showing the internal construction of a portable device having rotatable input buttons according to an exemplary embodiment of the present invention.

FIG. 3 is an internal block diagram showing the portable device having the rotatable input buttons according to the exemplary embodiment of the present invention.

As shown in FIG. 3, the portable device includes a signal input unit 110, an input button rotation detecting unit 120, a UI generating unit 130, a mode setting unit 140, a position checking unit 150, a display unit 160 and a control unit 180.

The signal input unit 110 receives a button signal according to the user's selection. That is, when a desired input button 21 is selected by the user, the signal input unit 110 receives a button signal generated through the selection.

The input button rotation detecting unit 120 detects whether the input buttons 21 are rotated by the user by detecting the rotation of the input buttons 21, and informs the control unit 180 of the detection of the rotation when the rotation of the input buttons 21 is detected.

The UI generating unit 130 generates objects 31 and a menu layer 35 to be displayed on the display panel 30.

When the rotation of the input buttons 21 is detected through the input button rotation detecting unit 120, the mode setting unit 140 changes the current mode of the portable device to a mode of operating on a desired object belonging to the objects 31 provided on the display panel 30 and corresponding to the position of a selected input button 21. The mode of the portable device 10 is classified as one of a basic mode and an input mode. The basic mode is set when the input button 21 is not rotated. In this mode, a pointer can move in the directions of movement set for the respective input buttons 21. The input mode is set when the input button 21 is rotated. In this mode, the object 31 arranged at the positions corresponding to the positions of the input buttons 21 can be manipulated.

When the rotation of the input buttons 21 is detected through the input button rotation detecting unit 120, the position checking unit 150 checks the new positions of the input buttons 21, changed by the rotation.

For example, when the user selects a desired input button 21, the object 31 disposed at the position corresponding to the selected input button 21 is determined based on the changed positions of the input buttons 21, as checked through the position checking unit 140. As a result of the determination, the object 31 disposed at the position corresponding to that of the selected input button 21 is activated and operated on.

The display unit 160 displays the objects 31 and the menu layer 35 generated through the UI generating unit 130. Furthermore, it displays the object 31 activated according to the user's selection.

The control unit 180 controls the respective functional blocks 110 to 170 that constitute the portable device 10.

The term "unit" used in the present embodiment (which may be a "module," "table," etc.) refers to software and hardware constituent elements, such as a Field Programmable Gate Array (FPGA) or an Application Specific Integrated Circuit (ASIC). The module may be adapted to perform various functions. However, this does not mean that the module is limited to software or hardware. The module may be configured to exist in a storage medium which is addressable and may be configured to execute on one or more processing units. For example, the module may include constituent elements, such as software constituent elements, object-oriented software constituent elements, class constituent elements and task constituent elements, processes, functions, attributes, procedures, subroutines, segments of program code, drivers, firmware, microcodes, circuits, data, databases, data structures, tables, arrays, and parameters. Functions provided within the constituent elements and the modules may be combined with a smaller number of constituent elements and modules or may be separated into additional constituent elements and modules. Furthermore, the constituent elements and the modules may be implemented to execute on one or more CPUs within a device.

Figure 4:
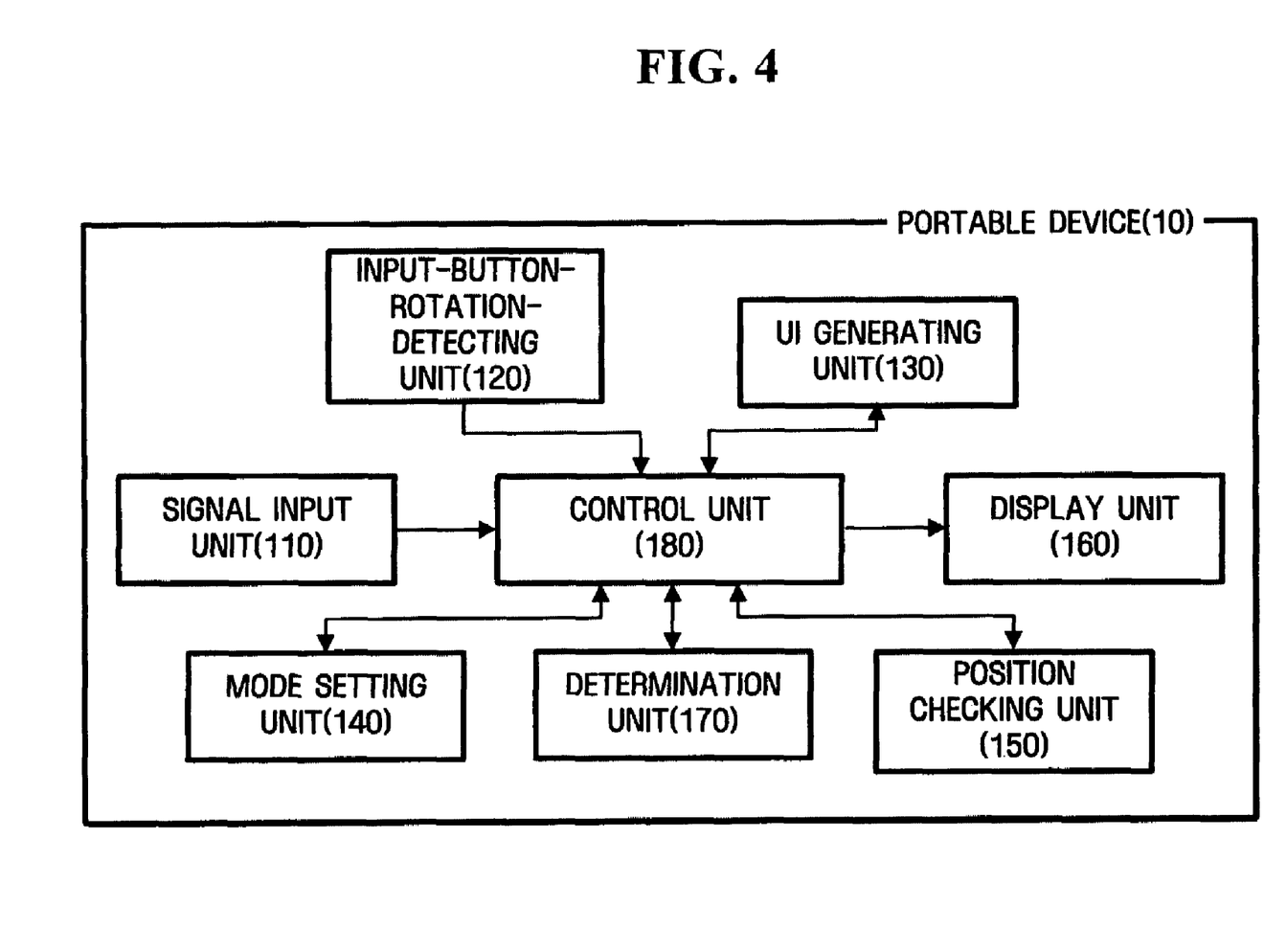
FIG. 4 is a block diagram showing the internal construction of a portable device having rotatable input buttons according to another exemplary embodiment of the present invention.

FIG. 4 is a block diagram showing the internal construction of a portable device 10 having rotatable input buttons according to another exemplary embodiment of the present invention.

As shown in FIG. 4, the portable device 10 includes a signal input unit 110, an input button rotation detecting unit 120, a UI generating unit 130, a mode setting unit 140, a position checking unit 150, a display unit 160, a determination unit 170, and a control unit 180. The signal input unit 110, input button rotation detecting unit 120, UI generating unit 130, position checking unit 150, display unit 160 and control unit 180 of the portable device 10 perform the same functions as described in FIG. 3, and the functions of the mode setting unit 140 and the determination unit 170 are added and executed in the present exemplary embodiment. Accordingly, only the functions of the mode setting unit 140 and the determination unit 170 are described here.

The determination unit 170 determines whether the positions of the rotated input buttons 21 checked by the position checking unit 150 are a first position or a second position. The first position refers to the original position of the input buttons 21 before they are rotated, and the second position refers to the changed position of the input buttons 21 after they have been rotated.

If, as a result of the determination in the determination unit 170, the positions of the input buttons 21 are determined to be the first position, the mode setting unit 140 sets the basic mode of selecting a desired object 31. If the positions of the input buttons 21 are determined to be the second position, the mode setting unit 140 sets the input mode of moving between menu layers 35.

For example, when the input buttons 21 are not rotated, the input buttons 21 are arranged at the first position, and a 2-dimensional menu layer 35 is displayed on the display panel 30.

When the input buttons 21 are rotated, the positions of the input buttons 21 are changed to the second position, and 3-dimensional menu layers 35 are displayed on the display panel 30. Therefore, the user can move between the displayed menu layers 35 and select one of the displayed menu layers 35 using a desired input button 21.

Figure 5A:
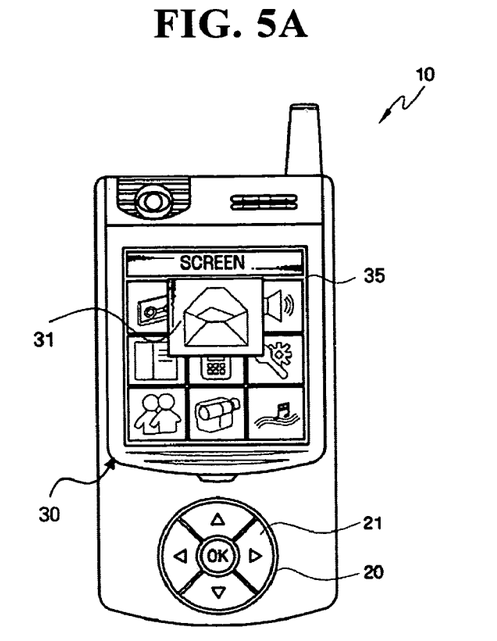
FIGS. 5A and 5B are diagrams showing an example in which a desired object is selected in response to the manipulation of an input button included in a portable device having rotatable input buttons according to another exemplary embodiment of the present invention.
Figure 5B:
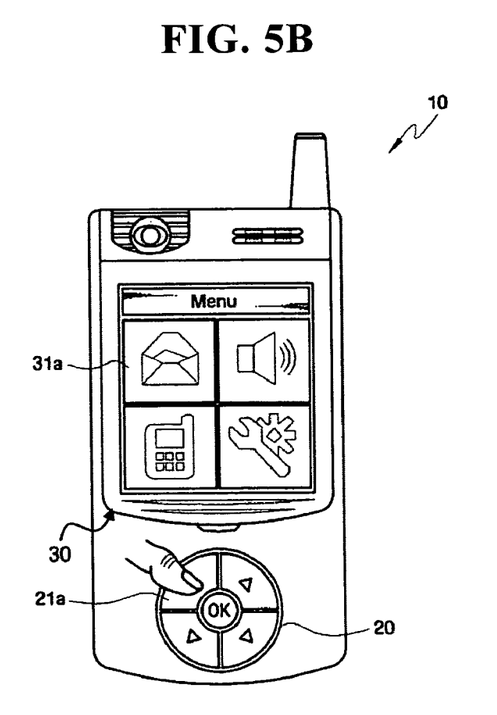

FIGS. 5A and 5B are diagrams showing an example in which a desired object is selected in response to the manipulation of an input button included in a portable device having rotatable input buttons according to another exemplary embodiment of the present invention.

As shown in FIG. 5A, a menu layer 35 having a number of objects 31 is displayed on a display panel 30, and an input button set 20 having a number of input buttons 21 is not rotated.

When the user rotates the input button set 20, as shown in FIG. 5B, the input buttons 21 are also rotated and, thus, the position of the input buttons 21 is changed and the mode of the portable device is changed and set.

When the mode of the portable device 10 is changed from a basic mode to an input mode and is set, a predetermined number of objects 31, arranged to correspond to the positions of the input buttons 21, is displayed on the display panel 30. That is, the rotated input buttons 21 are arranged in 1st, 2nd, 3rd and 4th quadrants, and the objects 31 displayed on the display panel 30 are arranged in a 2×2 arrangement to correspond to the 1st, 2nd, 3rd and 4th quadrants of the input buttons 21.

When the user selects a desired input button (for example, 21a), an object (for example, 31a) corresponding to the position of the selected input button 21a is activated and operated.

Figure 6A:
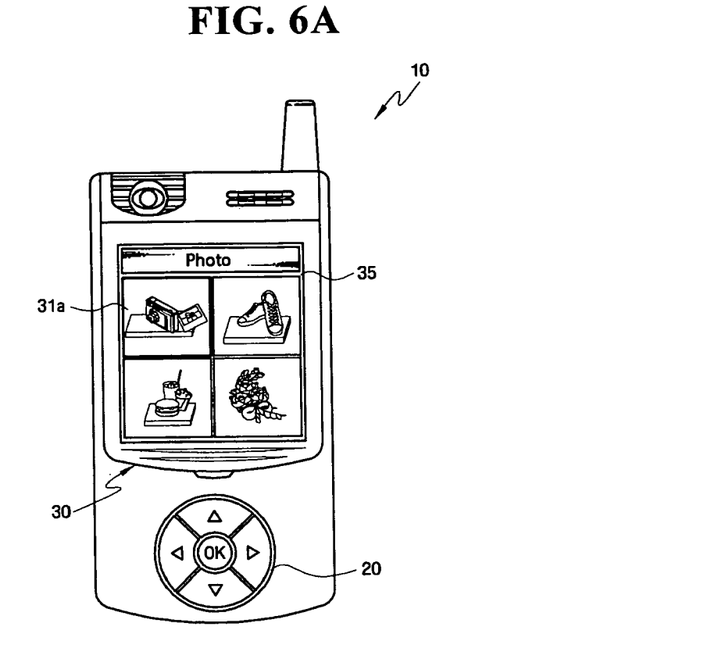
FIGS. 6A and 6B are diagrams showing an example in which a desired object is zoomed in and out in response to the manipulation of an input button provided in a portable device having rotatable input buttons according to another exemplary embodiment of the present invention.
Figure 6B:
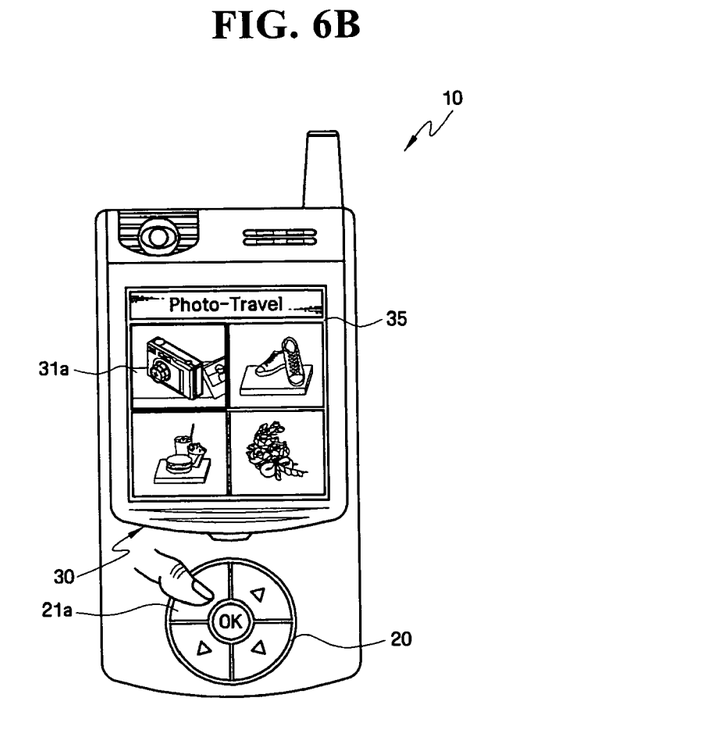

FIGS. 6A and 6B are diagrams showing an example in which a desired object is zoomed in and out in response to the manipulation of an input button provided in a portable device having rotatable input buttons according to another exemplary embodiment of the present invention.

As shown in FIG. 6A, a menu layer 35 including a number of objects 31 is displayed on a display panel 30, and an input button set 20 having a number of input buttons 21 is not rotated.

When the user rotates the input button set 26, as shown in FIG. 6B, the input buttons 21 are also rotated and, thus, the positions of the input buttons 21 are changed and the mode of the portable device is changed.

When the mode of the portable device 10 is changed from a basic mode to an input mode and the changed mode is set, a predetermined number of objects 31, arranged to correspond to the positions of the input buttons 21, is displayed on the display panel 30.

When the user selects a desired input button (for example, 21a), the image of an object (for example, 31a) corresponding to the position of the selected input button 21a is zoomed in and displayed.

Figure 7A:
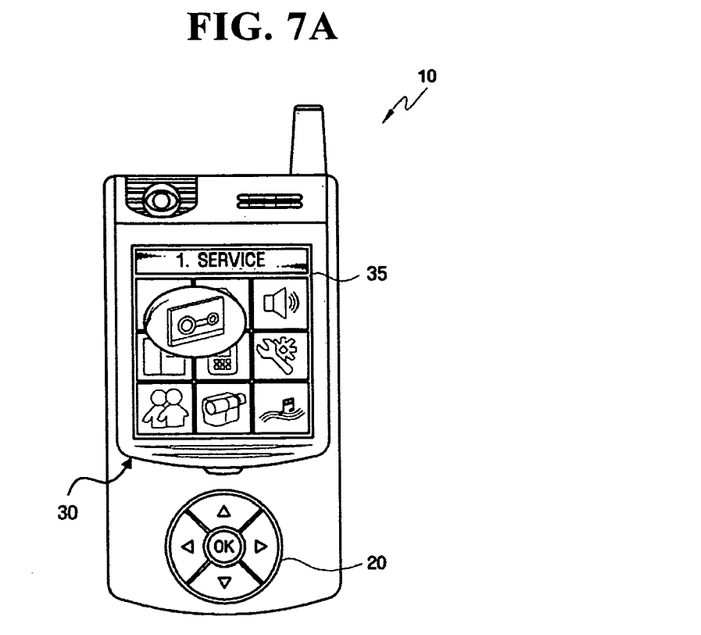
FIGS. 7A and 7B are diagrams showing an example in which menu layers provided 3-dimensionally are manipulated in response to the manipulation of an input button provided in a portable device having rotatable input buttons according to another exemplary embodiment of the present invention.
Figure 7B:
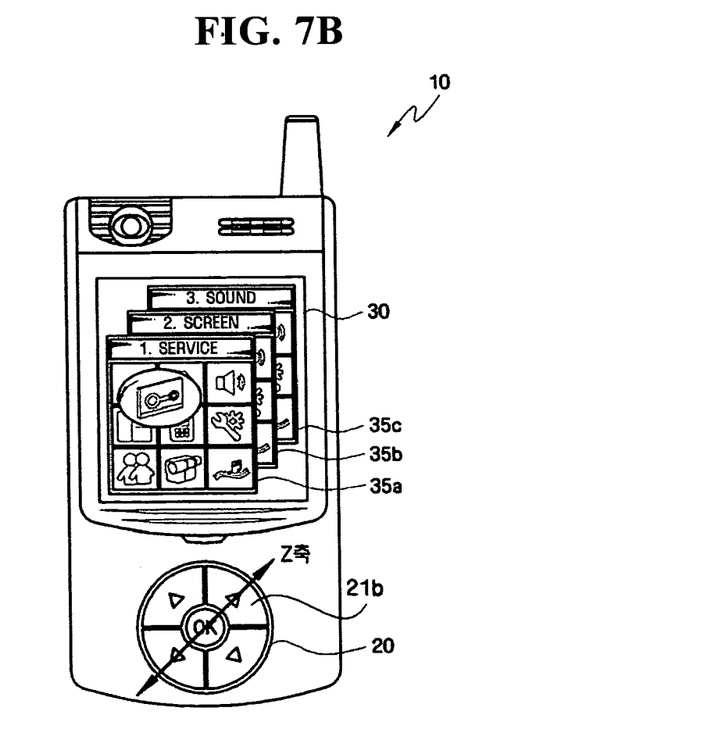

FIGS. 7A and 7B are diagrams showing an example in which menu layers provided in three dimensions are manipulated in response to the manipulation of an input button provided in a portable device having rotatable input buttons according to another exemplary embodiment of the present invention.

As shown in FIG. 7A, a menu layer 35 including a number of objects 31 is 2-dimensionally displayed on a display panel 30, and an input button set 20 having a number of input buttons 21 is not rotated.

When the user rotates the input button set 20, as shown in FIG. 7B, the input buttons 21 are also rotated and, thus, the positions of the input buttons 21 is changed to a second position and the mode of the portable device 10 is also changed.

When the mode of the portable device 10 is changed from a basic mode to an input mode, 3-dimensional menu layers 35a, 35b and 35c are displayed on the display panel 30.

Thereafter, when the user selects a desired input button (for example, 21b), the user can move between the menu layers 35a, 35b and 35c, which are 3-dimensionally displayed.

Particularly, when the user selects an input button (for example, 21b) once, a screen menu layer (for example, 35b) is selected and displayed as the uppermost menu layer. Furthermore, when the user selects the input button (for example, 21b) once again, a sound menu layer (for example, 35c) is selected and displayed as the uppermost menu layer.

Meanwhile, when the user desires to select an object from the uppermost (for example, 35a) of 3-dimensional menu layers 35a, 35b and 35c, the user changes the position of the input buttons 21 to a first position by rotating the input button set 20, and also changes the mode of the portable device. Thereafter, the user moves a focus to an object to be selected based on the directions of movement set for the respective input buttons 21.

Figure 8:
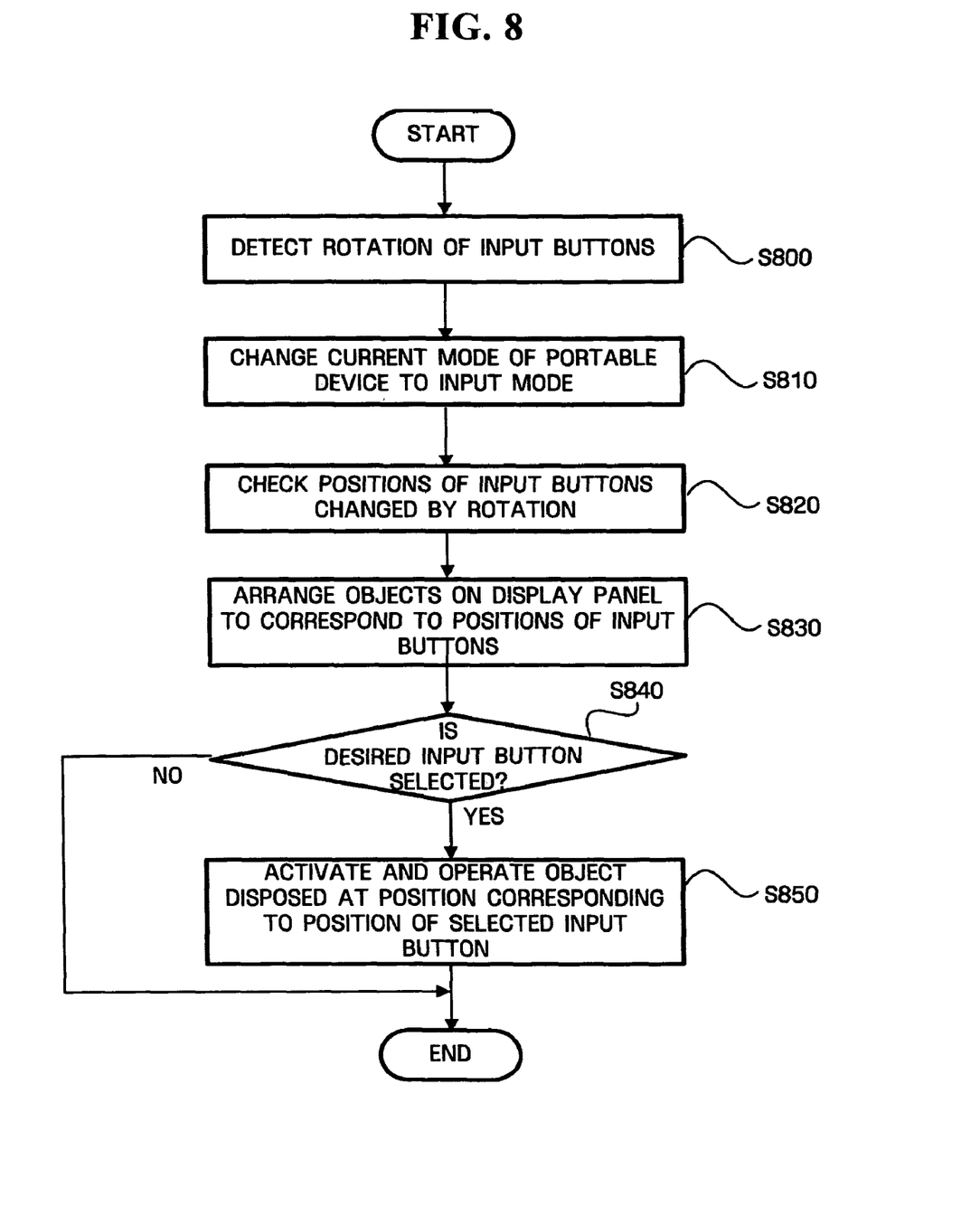
FIG. 8 is a flowchart showing a method of manipulating rotatable input buttons according to an exemplary embodiment of the present invention.

FIG. 8 is a flowchart showing a method of manipulating rotatable input buttons according to another exemplary embodiment of the present invention.

First, the input button rotation detecting unit 120 detects whether the input button set 20 has been rotated by the user at step S800. In this case, when the input button set 20 has been rotated, the input buttons 21 are also rotated.

If, as a result of the detection, the input buttons 21 are determined to have been rotated, the mode setting unit 140 changes the mode of the portable device 10 to an input mode and sets the input mode at step S810. In this case, the mode of the portable device 10 may be set to a basic mode and an input mode. The basic mode is set when the input buttons 21 are not rotated, and a pointer moves in the directions of movement set for the respective input buttons 21. The input mode is set when the input buttons 21 are rotated, and the objects 31 corresponding to the positions of the input buttons 21 may be manipulated.

Thereafter, when the mode of the portable device 10 is changed and set, the position checking unit 150 checks the positions of the input buttons 21 changed due to the rotation of the input button set 20 at step S820.

Thereafter, the UI generating unit 130 generates a UI suitable for the set input mode, and displays the generated UI on the display panel 30 through the display 160. That is, it displays the objects 31 arranged at the positions corresponding to the positions of the input buttons 21 (for example, in a 2×2 arrangement) at step S830.

When a desired input button 21 is selected by the user at step S840, the signal input unit 110 receives the generated button signal and transmits it to the control unit 180.

After the control unit 180 checks an object 31 disposed at the position corresponding to the position of the selected input button 21 based on the positions of the input buttons 21 checked by the position checking unit 150, the control unit 180 activates and operates the checked object at step S850.

Meanwhile, when an input button 21 is selected by the user in the case where the object 31 displayed on the display panel 30 is an image, the image of the object 31 disposed at the position corresponding to the position of the selected input button 21 is zoomed in (or zoomed out).

Accordingly, when the user desires to select the object 31 provided on the display panel 30, the user can activate the operation of a corresponding object by rotating the input button set 20 in a predetermined direction and selecting an input button 21 corresponding to the position of the object 31 to be selected. Therefore, the user can select and manipulate the desired object more rapidly and conveniently.

Figure 9:
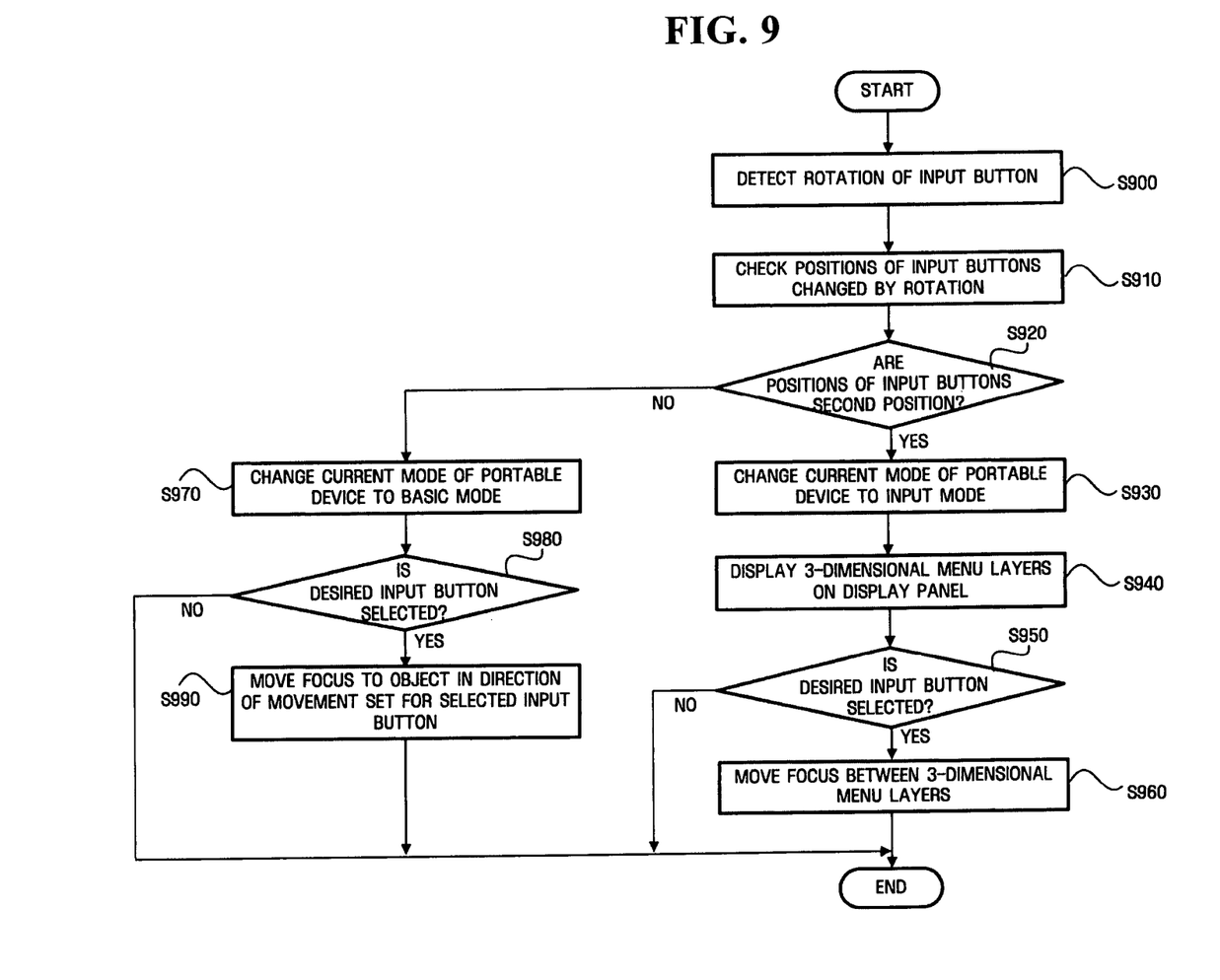
FIG. 9 is a flowchart showing a method of manipulating menu layers provided 3-dimensionally according to an exemplary embodiment of the present invention.

FIG. 9 is a flowchart showing a method of manipulating menu layers provided 3-dimensionally according to another exemplary embodiment of the present invention.

First, the input button rotation detecting unit 120 detects whether the input button set 20 has been rotated by a user at step S900. In this case, when the input button set 20 is rotated, the input buttons 21 are also rotated.

When the input buttons 21 are determined to rotate as a result of sensing the input button set 20, a position checking unit 150 checks the positions of the input buttons 21 changed due to the rotation of the input button set 20 (S910) and a determination unit 170 determines whether the position of the checked input buttons 21 is a first position or a second position.

If, as a result of the determination, the positions of the input buttons 21 are determined to have been rotated at step S920, the mode setting unit 140 changes the mode of the portable device 10 to an input mode and sets the input mode at step S930. In this case, the mode of the portable device 10 may be set to a basic mode and an input mode. The basic mode is set when the input buttons 21 are not rotated, and a pointer can move in the directions of movement set for the respective input buttons 21. The input mode is set when the input buttons 21 are rotated, and the menu layers 35 3-dimensionally displayed on the display panel 30 can be manipulated.

Thereafter, when the mode of the portable device 10 is changed to the input mode and the input mode is set, the UI generating unit 130 generates 3-dimensional menu layers 35 and displays the generated 3-dimensional menu layers 35 on the display panel 30 through the display unit 160 at step S940.

Thereafter, when a desired input button 21 is selected by the user at step S950, the signal input unit 110 receives the generated button signal and transmits it to a control unit 180.

Thereafter, when the desired input button 21 is selected by the user, the control unit 180 performs control so that a focus moves between the menu layers 35 displayed 3-dimensionally at step S960.

Meanwhile, when the user desires to select a desired object 31 from a desired menu layer 35 after having selected the desired menu layer 35, the user changes the positions of the input buttons 21 to the first position by rotating the input button set 20. Accordingly, the mode of the portable device 10 is changed to the basic mode and the basic mode is set. In this case, the user can move the focus to the object 31 to be selected based on the directions of movement set for the respective input buttons 21.

If, as a result of the determination, the positions of the input buttons 21 are determined to be the first position at step S920, the mode setting unit 140 changes the mode of the portable device 10 to the basic mode, and the basic mode is set at step S970. Thereafter, the UI generating unit 130 generates a 2-dimensional menu layer 35 and displays the generated 2-dimensional menu layer 35 on the display panel 30 through the display unit 160.

Thereafter, when a desired input button 21 is selected by the user at step S980, the signal input unit 110 receives the generated button signal and transmits it to the control unit 180.

Thereafter, when the desired button is selected by the user, the control unit 180 moves the focus to the object 31 to be selected based on the directions of movement set for the respective input buttons 21 at step S990.

Accordingly, the user can conveniently manipulate the menu layers 35 displayed in 3 dimensions only by selecting an input button 21.

According to the portable device having rotatable input buttons and method of manipulating the portable device according to aspects of the present invention, there are one or more of the following effects.

There is an advantage in that objects arranged to correspond to the positions of the rotated input buttons can be conveniently manipulated by rotating the input buttons provided in the portable device through a predetermined angle.

Furthermore, there is an advantage in that the menu layers (or desired content) provided in 3 dimensions on the display panel can be conveniently manipulated by rotating input buttons provided in the portable device through a predetermined angle.

Moreover, there is an advantage in that it is possible to select and manipulate a desired object and a 3-dimensional object using a button without the provision of a separate input device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable device having rotatable input buttons, comprising:
    an input button set which rotates in a desired direction respective to a casing of the portable device and has a number of input buttons;
    a display panel which displays objects corresponding to positions of rotated input buttons when rotation of the input buttons is detected; and
    a control unit which operates on an object corresponding to a position of a selected input button when the desired input button is selected.

2. The portable device of claim 1, further comprising:
    a button rotation detecting unit which detects rotation of the input buttons;
    a User Interface (UI) generating unit which generates desired objects; and
    a mode setting unit which changes a current mode of the portable device to a mode of operating on the objects corresponding to positions of the rotated input buttons when the rotation of the input buttons is detected.

3. The portable device of claim 1, wherein the objects are images, and an image of an object corresponding to a position of a selected input button is zoomed in and out in response to the selection of the input button.

4. The portable device of claim 1, further comprising:
    a position checking unit which checks the positions of the input buttons changed in response to the rotation of a user when the rotation of the input buttons is detected; and
    a display unit which displays the generated objects and an object operated on.

5. The portable device of claim 1, further comprising:
    a button rotation detecting unit which detects rotation positions of the input buttons;
    a determination unit which determines whether positions of the input buttons, changed in response to rotation of the input buttons, are a first position or a second position; and
    a mode setting unit which changes a current mode of the portable device to a mode of selecting a desired object and setting the changed mode if the positions of the input button are the first position, and which changes a current mode of the portable device to a mode of performing movement between 3 dimensional menu layers and setting the changed mode if the positions of the input buttons are at the second position.

6. The portable device of claim 5, further comprising:
    a position checking unit which checks the positions of the input buttons, changed according to the rotation when rotation of the input buttons is detected; and
    a display which displays generated objects and the 3-dimensional menu layers.

7. The portable device of claim 1, wherein:
    a display panel which displays 3-dimensional menu layers and the objects when the input buttons are rotated; and
    wherein the control unit which controls movement between the 3-dimensional menu layers when a desired input button is selected.

8. A method of manipulating a portable device having rotatable input buttons, the method comprising:
    detecting rotation of input buttons respective to a casing of the portable device;
    changing a current mode of the portable device to an input mode and setting the changed mode when the rotation of the input button is detected;
    displaying desired objects to correspond to positions of the input buttons when the current mode is changed to the input mode; and
    operating on an object corresponding to a position of a selected input button when the desired input button is selected.

9. The method of claim 8, wherein an image of an object corresponding to the position of the selected input button is zoomed in and out in response to the selection of the input button when the displayed objects are images.

10. The method of claim 8, further comprising:
    determining positions of the input buttons, changed in response to the rotation of the input buttons when the rotation of the input button is detected;
    wherein the changing a current mode of the portable device to an input mode and setting the changed mode if, as a result of the determination, the positions of the input button are determined to be a second position.

11. The method of claim 10, further comprising displaying 3-dimensional menu layers when the current mode is changed to the input mode; and
   selecting one from among the displayed 3-dimensional menu layers when a desired input button is selected.

12. The method of claim 11, further comprising:
   changing a current mode of the portable device to a basic mode and setting the changed mode if, as a result of the determination, locations of the input buttons are determined to be a first position; and
   selecting and operating objects from the 3-dimensional menu layers using the input buttons when the current mode is changed to the basic mode.

* * * * *